United States Patent [19]
Zaun et al.

[11] Patent Number: 5,899,307
[45] Date of Patent: May 4, 1999

[54] WHEEL MOTOR TORQUE HUB DISCONNECT

[75] Inventors: Richard David Zaun, West Des Moines; Howard C. Hadley, Des Moines, both of Iowa

[73] Assignee: Deere & Company, Moline, Ill.

[21] Appl. No.: 08/931,140

[22] Filed: Sep. 16, 1997

[51] Int. Cl.⁶ .................................................. F16D 11/14
[52] U.S. Cl. ..................................... 192/69.43; 192/69.91; 192/95; 192/96; 192/114 R
[58] Field of Search ............................... 192/69.4, 69.43, 192/69.9, 69.91, 114 R, 34, 96, 95; 475/298

[56] References Cited

U.S. PATENT DOCUMENTS

| | | | |
|---|---|---|---|
| 1,184,044 | 5/1916 | Stukart | 475/298 X |
| 2,757,770 | 8/1956 | Robertson | 192/69.91 X |
| 3,104,850 | 9/1963 | Wood | 192/69.19 X |
| 3,515,250 | 6/1970 | Cantalupo | 192/114 R |
| 4,043,226 | 8/1977 | Buuck | 475/158 |
| 4,453,852 | 6/1984 | Gilcrest | 192/69.43 X |
| 5,267,915 | 12/1993 | Estabrook | 192/69.19 X |

Primary Examiner—Rodney H. Bonck

[57] ABSTRACT

A wheel motor disconnect includes a rotatable plate with sized apertures including locking detents. A depressor pin extends perpendicularly from the plate. The apertures are received over shouldered spacers or guides which are connected to the wheel hub. In the drive position, the plate is located at the outermost ends of the spacers, and the pin is offset from the spring-loaded drive shaft to allow the shaft to drivingly engage a reduction gear arrangement. To disconnect the drive, the operator urges the plate axially inwardly against the bias of the drive shaft so that the apertures slide inwardly along the spacers to move the shaft out of driving relationship with the reduction gear arrangement. The operator then rotates the plate in a first direction so smaller apertures move into the shouldered area and prevent the plate from moving axially outwardly. The locking detents prevent rotation of the plate away from the shouldered area until the operator depresses the plate slightly and rotates the plate in the direction opposite the first direction.

20 Claims, 3 Drawing Sheets

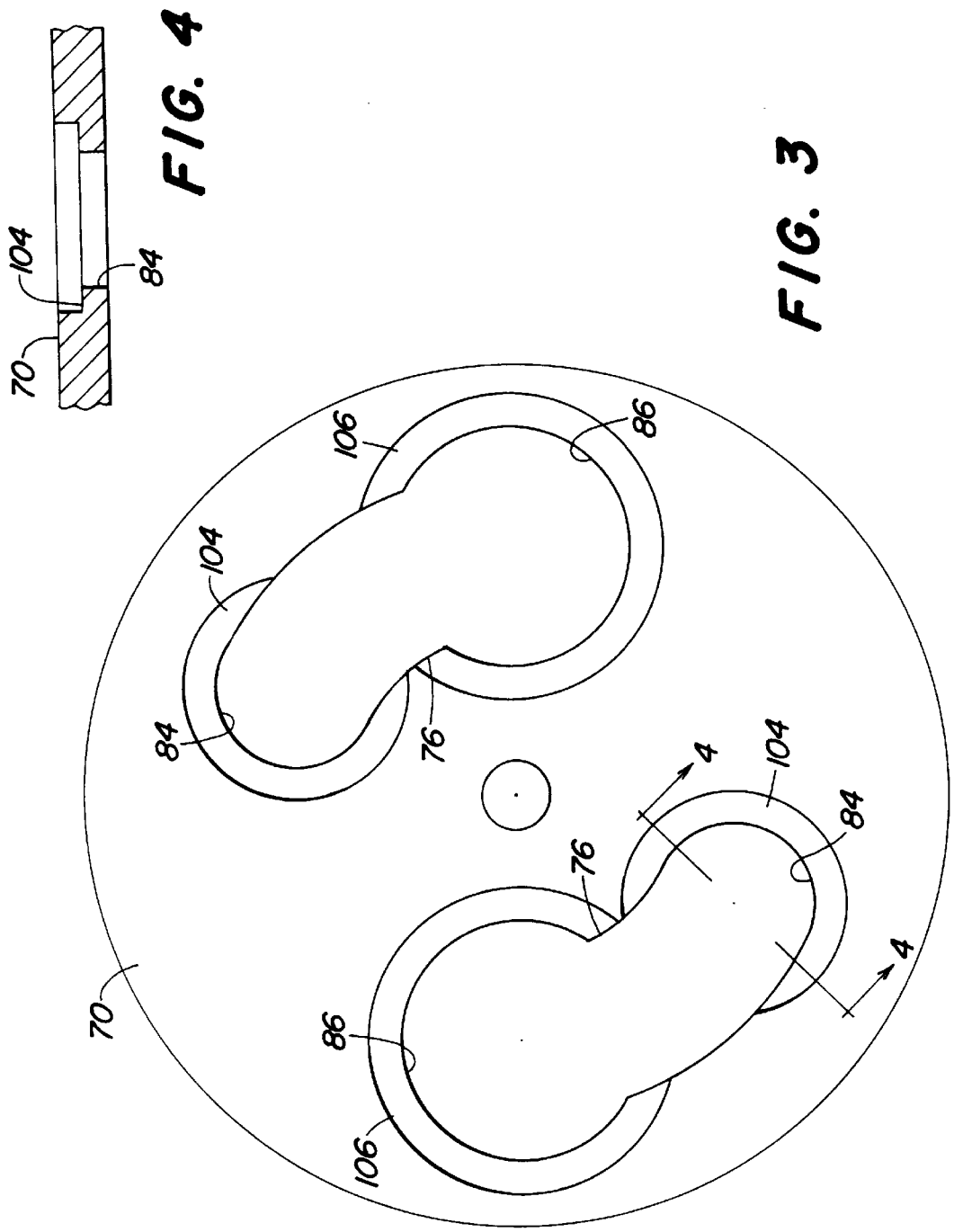

WHEEL MOTOR TORQUE HUB DISCONNECT

BACKGROUND OF THE INVENTION

1) Field of the Invention

The present invention relates generally to hydraulically driven implements and, more specifically, to structure for selectively engaging and disengaging hydraulic wheel motors for such implements.

2) Related Art

Hydraulic wheel motors are commonly used in implements such as agricultural sprayers to provide good drive characteristics and facilitate wheel tread adjustments for varying row spacings. The drive arrangement requires that the wheel motor drive be disconnected from the reduction gear to avoid damage to the hydrostatic system during towing of the implement. If the operator fails to disconnect the drive, the reduction gear drives the hydraulic motor at a high rate of rotation, and the motor can be damaged after being towed only a relatively short distance. Present disconnect systems, an example of which is shown in FIG. 1, typically include a reversible cap having a drive position wherein an axially movable, spring-loaded splined drive shaft is released and extends into driving connection with a planetary gear structure in the hub. The cap has a depressor which, when the cap is reversed, urges the splined drive shaft away from driving relationship with the reduction gear. Reversible cap arrangements are inconvenient and time consuming to operate. Other types of systems relying on detents become sticky and undependable after operating in the severe agricultural environment.

BRIEF SUMMARY OF THE INVENTION

It is therefore an object of the present invention to provide an improved hydraulic wheel motor disconnect system. It is a further object to provide such a system which overcomes most or all of the aforementioned problems.

It is a further object of the present invention to provide an improved hydraulic wheel motor disconnect system that is easy to operate. It is a further object to provide such a system which is simple and yet effective and reliable in operation.

It is still another object of the present invention to provide an improved wheel disconnect system which can be operated using a single tool such as a screwdriver. It is still another object to provide such a system which eliminates removal of parts from the hub area when selecting either the drive or disconnect conditions.

It is a further object to provide an improved wheel motor disconnect system that is easy to install and may be retrofitted to existing wheel motors.

A wheel motor disconnect system constructed in accordance with the teachings of the present invention includes a rotatable plate with sized apertures defining locking detents. A depressor pin extends perpendicularly from the plate. The apertures are received over shouldered spacers which are connected to the wheel hub. In the drive position, the plate is located at the outermost ends of the spacers, and the pin is offset from the spring-loaded drive shaft to allow the shaft to drivingly engage the reduction gear arrangement. To disconnect the drive, the operator urges the plate axially inwardly against the bias of the drive shaft so that the apertures move inwardly along the spacers to move the shaft out of driving relationship with the reduction gear arrangement. The operator then rotates the plate in a first direction so smaller apertures move into the shouldered area and prevent the plate from moving axially outwardly. Locking detents prevent rotation of the plate away from the shouldered area until the operator depresses the plate slightly and rotates the plate in the direction opposite the first direction so that larger apertures move adjacent the spacers to allow the plate to move outwardly so the shaft drivingly engages the reduction gear arrangement and reengages the wheel motor.

The system is simple to install, even on existing systems, and operates dependably with a simple tool such as a screwdriver or hex wrench. No parts have to be removed or reinstalled when changing between drive and non-drive conditions. Drive engagement is positive, and malfunctions are minimized or eliminated.

These and other objects, features and advantages of the present invention will become apparent to one skilled in the art upon reading the following detailed description in view of the drawings.

BRIEF DESCRIPTION OF THE DRAWINGS

FIG. 3 is a plan view of the disconnect plate for the system of FIG. 2.

FIG. 4 is a sectional view taken along lines 4—4 of FIG. 3.

DETAILED DESCRIPTION OF THE DRAWINGS

Prior Art

Figure 1:
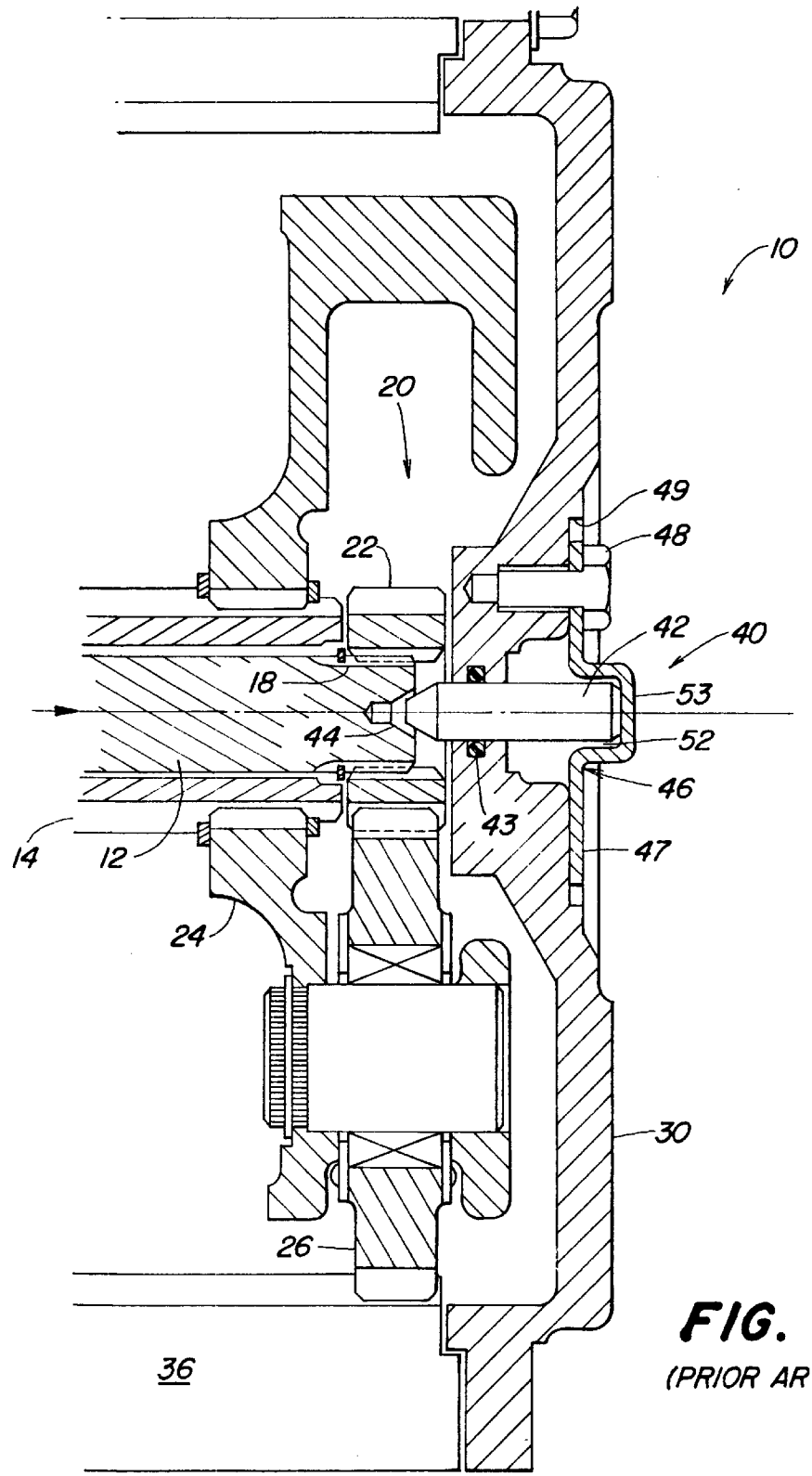
FIG. 1 is a side view, partially in section, of a wheel motor disconnect system typical of the prior art.

Referring now to FIG. 1, therein is shown a sprayer wheel drive structure 10 typical of the prior art having an axially movable drive shaft 12 supported for rotation relative to a drive shaft housing 14. The drive shaft 12 connected at an inner end to a hydrostatic motor (not shown) has a splined outermost portion 18 and is biased outwardly (that is, to the right as viewed in FIG. 1) to engage a reduction gear assembly indicated generally at 20. The gear assembly 20 includes a sun gear 22 which is splined to be drivingly engaged by the portion 18 when the drive shaft 12 is in a axially outermost drive position (shown). The gear assembly 20 also includes a planet pinion carrier 24 supported on the shaft housing 14. Planet pinions 26 are supported on the carrier 24 and mesh with the sun gear 22. A wheel hub 30 is bolted to a ring gear 36 which meshes with the planet pinions 26 to provide a reduction drive from the shaft 12 to the hub 30 to drive the vehicle.

The gear ratio of the assembly 20 is on the order of 34:1 so that if the vehicle is towed with the drive engaged, the hydrostatic motor will be driven at high RPM and can be damaged in a very short period of time. To disconnect drive between the motor and the wheel hub 30, a reversible cap and pin assembly 40 is provided. The assembly 40 includes an axially movable pin 42 slidably received within an aperture and O-ring 43 at the center of the hub 30 in alignment with mating cavity 44 at the end of the shaft 12. A hat-shaped cap 46 is connected through a brim portion 47 by two bolts 48 to an inner shouldered portion 49 of the hub 30 and is reversible between a normal operating position and a non-drive position. In the operating position shown in FIG. 1, the outermost end of the pin 42 enters a cylindrical cavity 52 of a projection 53 so that the shaft 12 is in its outermost position and the splined portion 18 engages the splines of the sun gear 22. To disconnect drive, the operator removes the bolts 48, reverses the cap 46, and replaces the bolts 48. The projection 53 on the cap 46 depresses the pin 42 which in turn engages the end of the shaft 12 and urges the shaft 12 axially inwardly out of driving relationship with the sun gear.

The improved drive disconnect system

Figure 2:
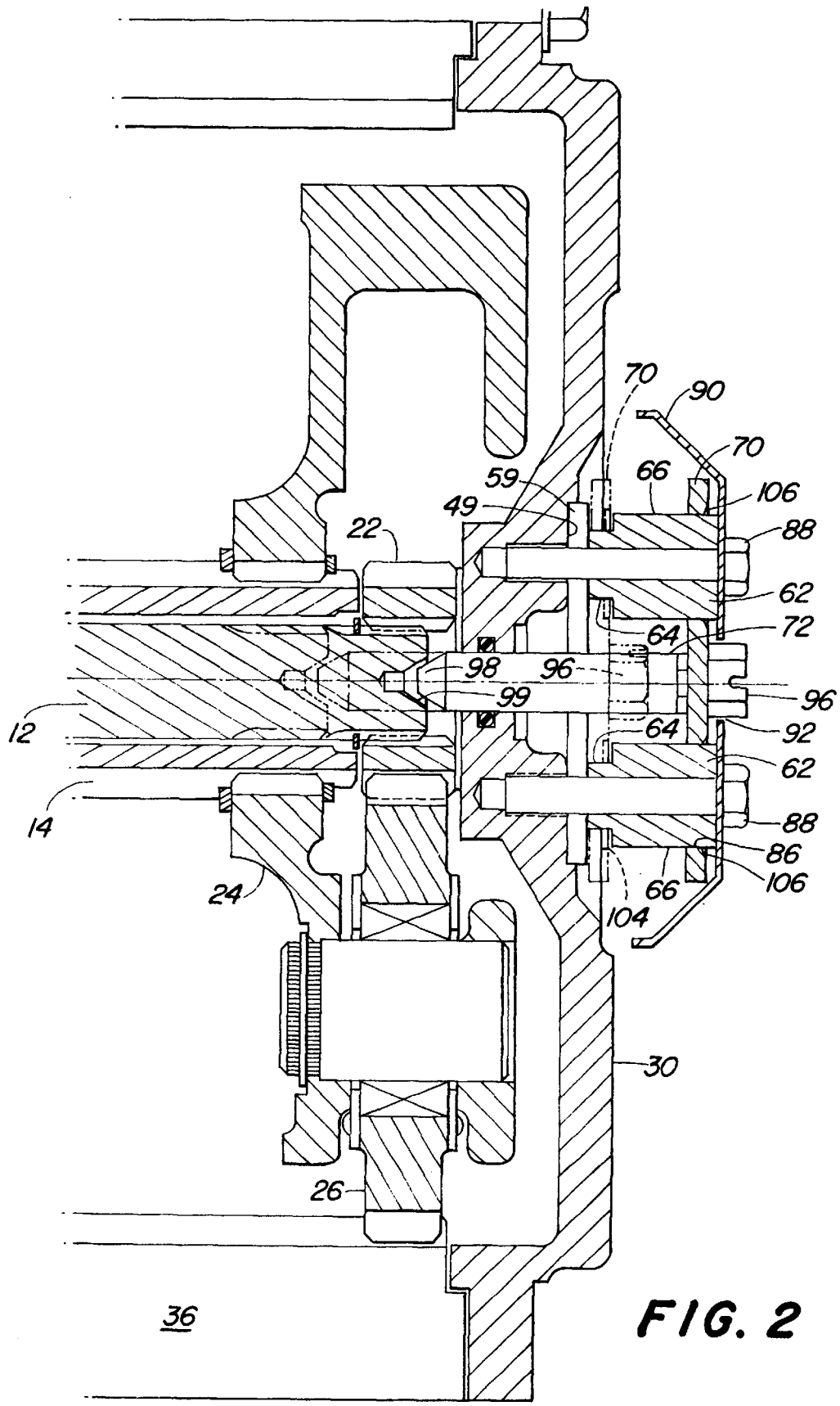
FIG. 2 is a view similar to FIG. 1 but showing an improved hydraulic wheel motor disconnect system.

Referring now to FIGS. 2 and 3, an improved drive disconnect system which may be retrofitted to the hub 30 will be described in detail. The system includes an apertured spacer plate 59 seated in the shouldered portion 49 of the hub 30. A pair of cylindrical, stepped spacers or guides 62 have shouldered ends 64 of first diameter that abut the spacer plate 59 and elongated cylindrical projections 66 that extend outwardly from the shouldered ends 64. A rotatable slotted plate 70 (FIGS. 2 and 3) is fixed to a depressor pin 72 (FIG. 2) and includes detent slots 76. The slots 76 each having a first opening 84 of diameter slightly larger than the diameter of the shouldered ends 64 of the spacers 62 and a second opening 86 of diameter slightly larger than the diameter of the cylindrical projections 66. The openings 86 are received over the respective projections 66 to permit the plate 70 to slide between an engage position (solid lines of FIG. 2) wherein the depressor pin 72 is located in an axially outward position (to the right as seen in FIG. 2), and a disengage position wherein the pin 72 depresses the shaft 12 to disengage drive from the motor.

The spacers 62 and the spacer plate 49 are secured in position on the hub 30 by a pair of elongated bolts 88 screwed into the same threaded bores that previously received the bolts 48. A sheet steel protective cap 90 with a central aperture 92 is secured against the ends of the projections 66 by the heads of the bolts 88. The pin 72 has an outer headed and slotted end 96 adapted to receive either a screwdriver or a hex wrench, and a tapered end which mates with a tapered bore 99 in the end of the shaft 12. By pushing inwardly on the end 96, the plate 70 slides inwardly over the spacers 62 and the pin end 98 pushes the shaft 12 inwardly against the bias until the shaft is completely disengaged from the sun gear 22. The plate 70 then is aligned with the smaller diameter shouldered ends 64 of the spacers 62 allowing the operator to use the screwdriver or wrench to rotate the plate 70 in the clockwise direction so the smaller diameter openings 84 of the slots 76 are positioned in the shouldered area preventing the plate 70 and the pin 72 from sliding axially outwardly over the spacers and locking the shaft 12 in the disengaged position (broken lines of FIG. 2). The peripheries of the openings 84 include a square shouldered counter-bore at 104 (FIG. 4) to define a detent with the shouldered area of the spacers 62 so the plate 70 is firmly secured against rotation in the disengage position.

To move the plate 70 from the disengage position, the operator inserts the tool through the aperture 92 in the cap 90 and depresses the pin 72 slightly while rotating the pin in the counterclockwise direction until the larger openings 86 in the slots 76 align with the projections 66. The outward bias of the shaft 12 against the pin 72 causes the plate 70 to slide up the spacers 66 until the splined portion 18 of the shaft fully engages the sun gear 22. The peripheries of the larger openings 86 are beveled at 106 to help guide the openings 86 into sliding relationship with the projections 66.

Having described the preferred embodiment, it will become apparent that various modifications can be made without departing from the scope of the invention as defined in the accompanying claims.

We claim:

1. A hydraulic wheel drive including a hub area having a driven gear and a drive shaft, the drive shaft having a drive position wherein the shaft engages the driven gear and an axially offset non-drive position wherein drive is removed from the driven gear, and a wheel drive disconnect system, the wheel drive disconnect system comprising:

a plate including an aperture;

a depressor pin connected to the plate;

guide structure connected to the hub area adjacent the drive shaft and receiving the plate aperture for movement of the plate between a disconnect position wherein the depressor pin moves the drive shaft to the non-drive position and a connect position wherein the shaft is in the drive position; and securing structure selectively maintaining the plate in the disconnect position.

2. The hydraulic wheel drive as set forth in claim 1 wherein the plate is rotatable and the securing structure includes a shouldered area on the guide structure maintaining the plate in the disconnect position when rotated to the securing position.

3. The hydraulic wheel drive as set forth in claim 2 wherein the aperture comprises a slot facilitating sliding of the plate over the guide structure and rotation of the plate relative to the guide structure.

4. The hydraulic wheel drive as set forth in claim 1 wherein the guide structure comprises a cylindrically shaped member of preselected diameter and a shouldered portion, and wherein the plate includes a slot, the slot and shouldered portion defining the securing structure.

5. The hydraulic wheel drive as set forth in claim 4 wherein the plate is rotatable, and the slot includes an end having a diameter less than the preselected diameter and rotatable with the plate to a position abutting the shouldered portion.

6. A hydraulic wheel drive system including a hub area having a driven gear and a drive shaft, the drive shaft having a drive position wherein the shaft engages the driven gear and an axially offset non-drive position wherein drive is removed from the driven gear, and wheel drive disconnect structure comprising:

an axially movable pin supported in the hub area in axial alignment with the drive shaft, the pin having an inwardmost position urging the shaft to the non-drive position, and an outer position wherein the drive shaft can assume the drive position;

the pin including a pin portion facilitating rotation and axial movement of the pin;

indexing structure connected to the pin and rotatable therewith between first and second rotated positions; and wherein the pin is movable axially when the indexing structure is in the first rotated position and is secured against axial movement when the pin is in the second rotated position.

7. The system as set forth in claim 6 wherein the indexing structure comprises a plate fixed to the pin and having elongated slots, and further including axially extending guides slidably receiving the slots.

8. The system as set forth in claim 7 wherein the guides include an end having a shouldered portion, the shouldered portion and the slots defining the indexing structure.

9. The system as set forth in claim 7 wherein the pin, plate, and guides are connected by bolts to the hub area and remain connected to the hub area as the drive shaft is changed between the drive and non-drive positions.

10. The system as set forth in claim 8 wherein the slots have shouldered peripheral portions for securing the plate against rotation when in the second rotated position.

11. The system as set forth in claim 10 wherein the slots include a beveled portion for aligning the slots with the guides when the indexing structure is rotated to the first rotated position.

12. The system as set forth in claim 7 including bolt structure connecting the guides to the hub area, and a cover secured outwardly of the hub area by the bolt structure.

13. The system as set forth in claim 12 wherein the cover includes a cover aperture axially aligned with the pin, and the pin portion includes a tool-receiving end accessibly through the cover aperture.

14. The system as set forth in claim 13 wherein the tool-receiving end comprises a headed end adapted for receiving a hex wrench.

15. The system as set forth in claim 14 wherein the headed end is slotted for receiving a screwdriver.

16. A wheel drive system including a hub area having a driven gear and a drive shaft, the drive shaft having a drive position wherein the shaft engages the driven gear and an axially offset non-drive position wherein drive is removed from the driven gear, and wheel drive disconnect structure comprising:

an axially movable pin supported in the hub area in axial alignment with the drive shaft, the pin having an inwardmost position urging the shaft to the non-drive position, and an outer position wherein the drive shaft can assume the drive position;

indexing structure connected to the pin and rotatable therewith between first and second rotated positions;

wherein the indexing structure is rotatable between the first and second rotated positions when the pin is in the inwardmost position and includes a detent for securing the indexing structure in the second rotated position and thereby preventing movement of the pin from the inwardmost position towards the outer position.

17. The system as set forth in claim 16 wherein the indexing structure includes a slotted plate and guide structure slidably receiving the slotted plate.

18. The system as set forth in claim 17 wherein the slotted plate is movable axially inwardly to release the indexing structure for rotation away from the second rotated position towards the first rotated position to allow the shaft to move to the drive position.

19. The system as set forth in claim 18 wherein the guide structure includes a stepped cylindrical member defining a shouldered area, and wherein slotted plate includes a bored area received by the shouldered area when the plate is in the second rotated position.

20. The system as set forth in claim 18 wherein the guide structure extends axially outwardly from the hub area and the slotted plate is located at an inwardmost extremity of the guide structure adjacent the hub area when the pin is in the inwardmost position.

* * * * *